United States Patent
Fakhruddin et al.

(10) Patent No.: US 6,791,621 B2
(45) Date of Patent: Sep. 14, 2004

(54) IMAGE PROCESSING APPARATUS AND METHOD AND SIGNAL SWITCHING OUTPUT DEVICE

(75) Inventors: Muzaffar Husain Bin Fakhruddin, Tokyo (JP); Seiko Imai, Chiba (JP); Toshio Sarugaku, Chiba (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 09/894,308

(22) Filed: Jun. 27, 2001

(65) Prior Publication Data

US 2002/0021366 A1 Feb. 21, 2002

(30) Foreign Application Priority Data

Jun. 29, 2000 (JP) ........................................ 2000-197403

(51) Int. Cl.$^7$ ............................ H04N 7/01; H04N 11/20
(52) U.S. Cl. ........................ 348/448; 348/449; 348/911
(58) Field of Search ................................ 348/458, 459, 348/448, 443, 441, 449, 558, 911; H04N 7/01, 11/20

(56) References Cited

U.S. PATENT DOCUMENTS

| | | | | |
|---|---|---|---|---|
| 4,876,596 A | * | 10/1989 | Faroudja | ..................... 348/450 |
| 4,881,125 A | * | 11/1989 | Krause | ....................... 348/448 |
| 5,596,371 A | | 1/1997 | Pakhchyan et al. | |

FOREIGN PATENT DOCUMENTS

| | | |
|---|---|---|
| EP | 1 005 227 | 5/2000 |
| WO | WO 99 20040 | 4/1999 |

* cited by examiner

*Primary Examiner*—Michael H. Lee
(74) *Attorney, Agent, or Firm*—Frommer Lawrence & Haug LLP; William S. Frommer; Bruno Polito (57) ABSTRACT

A line doubling processing system has an input signal switching output section for receiving sequential input fields and for outputting, based on the sequential input fields, a plurality of fields obtained from the same image, and a line doubling device for generating one line-doubled field using the plurality of fields that are output from the input signal switching output section.

14 Claims, 7 Drawing Sheets

FIG. 1A

ORIGINAL IMAGE

LINE DOUBLING

FIG. 1B

LINE-DOUBLED IMAGE

| INPUT FIELD | NTSC SIGNAL TIMING | | | | | | | | |
|---|---|---|---|---|---|---|---|---|---|
| | A | A' | B | B' | C | C' | D | D' | E |
| INVENTION | | | | | | | | | |
| 1ST OUTPUT FIELD | Z | A' | A | B' | B | C' | C | D' | D |
| 2ND OUTPUT FIELD | Z' | A | A' | A | B' | B | C' | C | D' |
| 3RD OUTPUT FIELD | Z | A' | A | B' | B | C' | C | D' | D |
| SWITCH CONTROL SIGNAL | 0 | 1 | 0 | 0 | 1 | 0 | 0 | 1 | 0 |
| ORDINARY OPERATION | | | | | | | | | |
| 1ST OUTPUT FIELD | A | A' | B | B' | C | C' | D | D' | E |
| 2ND OUTPUT FIELD | Z' | A | A' | A | B' | B | C' | C | D' |
| 3RD OUTPUT FIELD | Z | A' | A | B' | B | C' | C | D' | D |

FIG. 7

| | | PAL SIGNAL TIMING | | | | | | | |
|---|---|---|---|---|---|---|---|---|---|
| INPUT FIELD | A | A' | B | B' | C | C' | D | D' | E | E' | F | F' |

| INVENTION | | | | | | | | | | | | |
|---|---|---|---|---|---|---|---|---|---|---|---|---|
| 1ST OUTPUT FIELD | Z | A' | A | B' | B | C' | C | D' | D | E' | E | F' |
| 2ND OUTPUT FIELD | Z' | A | A' | B | B' | C | C' | D | D' | E | E' | F |
| 3RD OUTPUT FIELD | Z | A' | A | B' | B | C' | C | D' | D | E' | E | F' |
| SWITCH CONTROL SIGNAL | 0 | 1 | 0 | 1 | 0 | 1 | 0 | 1 | 0 | 1 | 0 | 1 |

| ORDINARY OPERATION | | | | | | | | | | | | |
|---|---|---|---|---|---|---|---|---|---|---|---|---|
| 1ST OUTPUT FIELD | A | A' | B | B' | C | C' | D | D' | E | E' | F | F' |
| 2ND OUTPUT FIELD | Z' | A | A' | B' | B | C | C' | D | D' | E | E' | F |
| 3RD OUTPUT FIELD | Z | Z' | A | A' | B | B' | C | C' | D | D' | E | E' |

IMAGE PROCESSING APPARATUS AND METHOD AND SIGNAL SWITCHING OUTPUT DEVICE

BACKGROUND OF THE INVENTION

1. Field of the Invention

The present invention relates to an image processing apparatus and method and a signal switching output device for performing processing of doubling the number of scanning lines of a field. More specifically, the invention relates to an image processing apparatus and method for generating one field in which the number of scanning lines has been doubled by using a plurality of fields as well as to a signal switching output device that is used in such an image processing apparatus.

2. Description of the Related Art

A technique of increasing the vertical resolution of an image by increasing the number of scanning lines per field is known as a technique for improving the image quality in a TV signal transmission system. Line doubling devices that double the number of scanning lines per field are known as devices that perform such processing. Among the line doubling device is a type that generates one line-doubled field using three fields. This type of line doubling device rearranges three input fields and processes, at an arbitrary time point, only fields obtained from one frame. This line doubling device is configured based on an algorithm that is optimized for line doubling on an ordinary camera source input having different motion phases for respective fields.

Figure 1A:
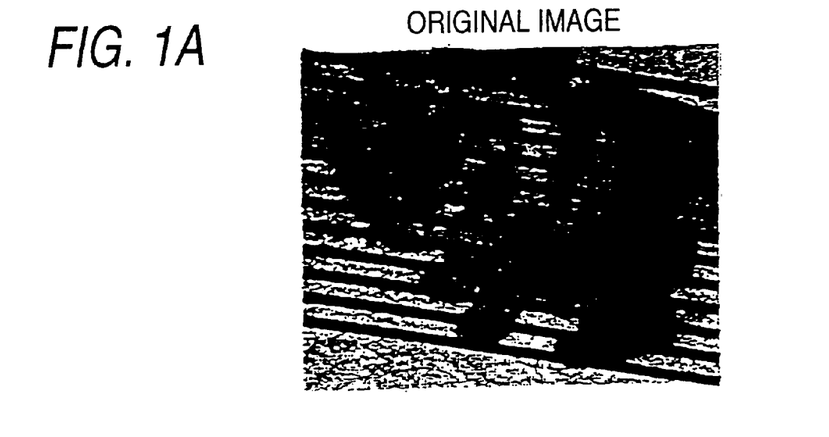
FIGS. 1A and 1B show images that are obtained before and after line doubling processing.
Figure 1B:
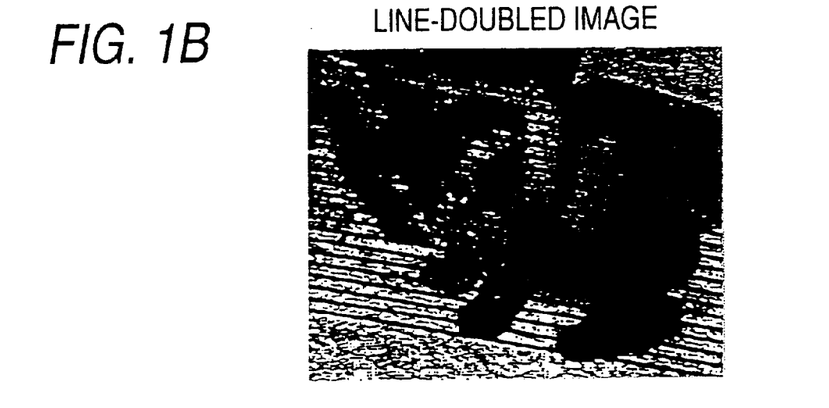

FIGS. 1A and 1B show images that are obtained before and after line doubling processing by the line doubling device. The line doubling device produces a line-doubled image shown in FIG. 1B based on a pre-processing image shown in FIG. 1A.

Figure 2:
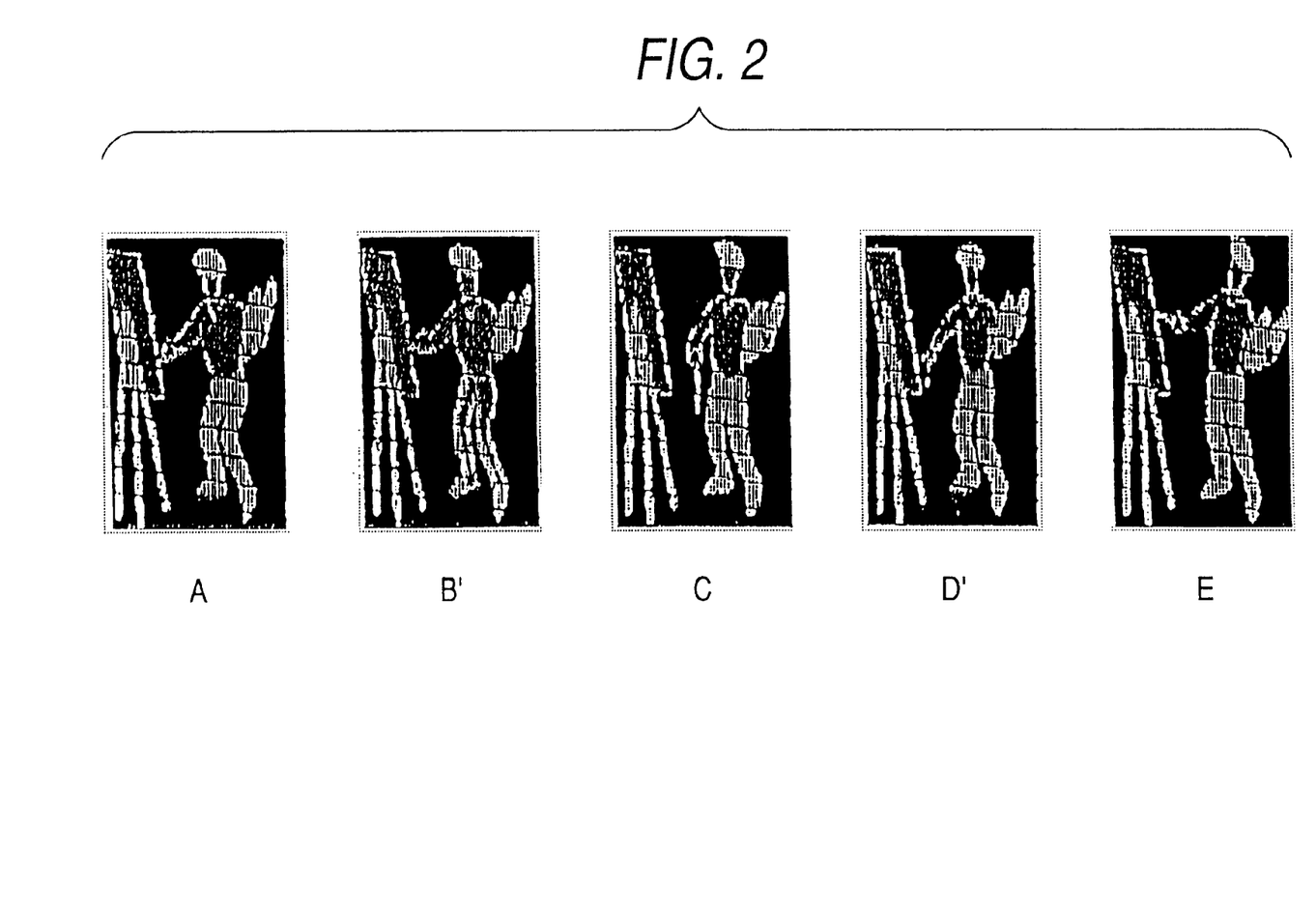
FIG. 2 shows field images of a camera source.

On the other hand, for example, to convert interlaced images having 525 scanning lines per frame (525i) into progressive images having 525 scanning lines per frame (525p), processing that utilizes inter-field correlation or intra-field correlation is generally performed.

Where the input is a camera source of (525i, for example, images of five consecutive fields A, B', C, D', and E are different from each other as shown in FIG. 2. Fields A, C, and E are odd-numbered fields of frames and fields B' and D' are even-numbered fields of frames.

In converting images of 525i into images of 525p, progressive images having 525 scanning lines per field are obtained by combining interlaced images of field A (scanning lines: 262.5) and field B' (scanning lines: 262.5) that are consecutive and whose contents vary as time elapses.

As a result of the above processing, the number of scanning lines per field is doubled. Since the image contents of the consecutive fields vary as time elapses, the vertical resolution of combined images (frames) is also doubled.

Incidentally, where input images as a subject of line doubling processing are from a film source, no effective result is obtained even if line doubling processing is performed by the above line doubling device. The reason is as follows.

NTSC TV systems are of 30 frames per second (60 fields per second) while film sources of movies etc. are usually of 24 frames per second. Therefore, to convert a film source into a TV signal, number-of-frames conversion processing such as 3-2 pull-down (3:2 pull-down) processing is generally performed.

Figure 3:
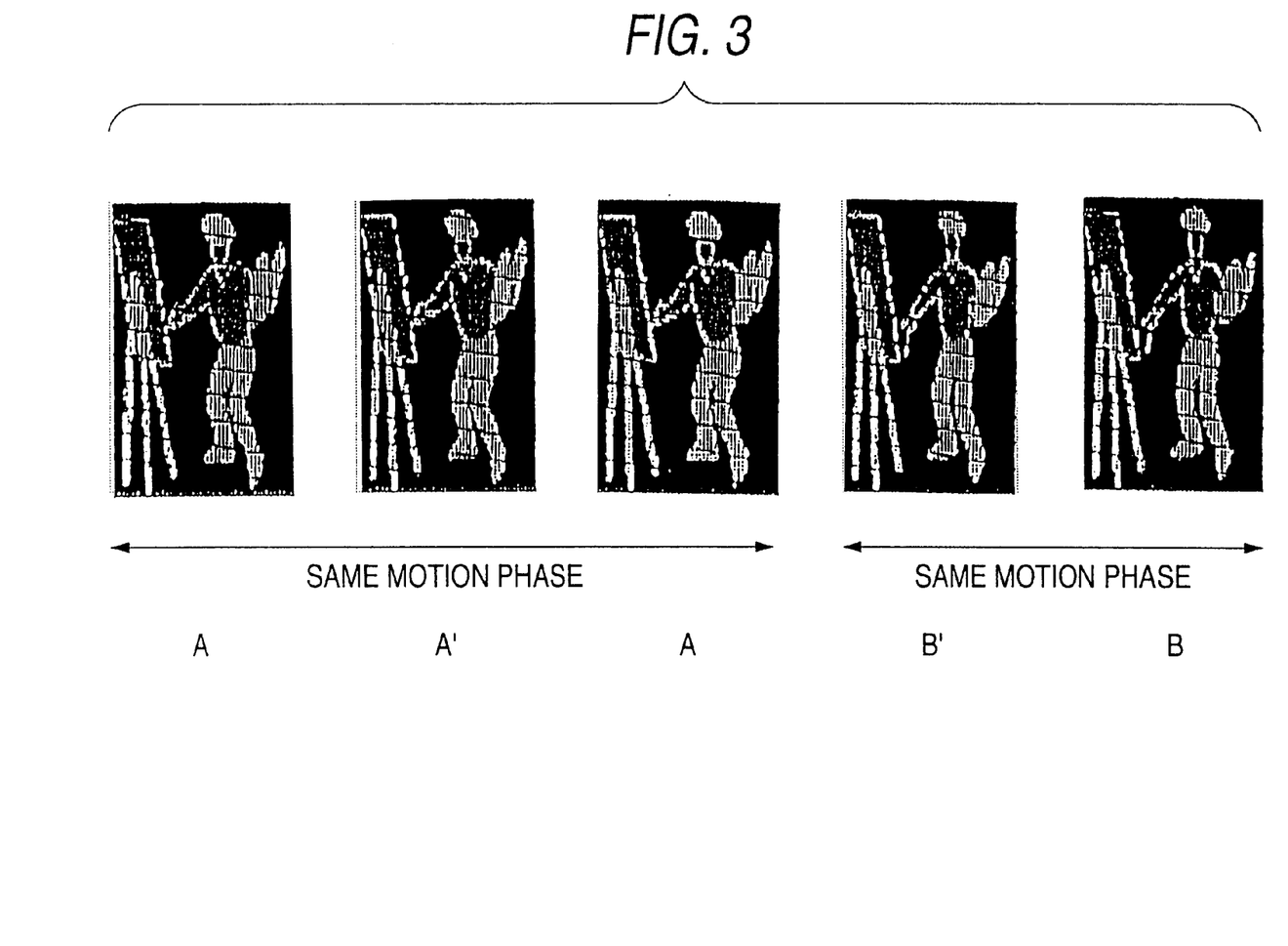
FIG. 3 shows field images obtained from a film source by 3-2 pull-down processing.

The 3-2 pull-down processing is such that a reading operation of reading out the first one of two consecutive frames of a film source as three fields of a video signal and reading out the next frame as two fields is repeated. For example, as shown in FIG. 3, the first frame is read out as three fields A, A', and A of a video signal and the next frame is read out as two fields B' and B of the video signal. In this manner, in the 3-2 pull-down processing, consecutive fields having the same image contents are produced in numbers 3, 2, 3, 2, 3, . . . to form a video signal.

Therefore, in an NTSC signal obtained by the 3-2 pull-down processing, motion (a motion phase) occurs every three or two fields. As a result, the line doubling device having the algorithm that is based on the assumption that different motion occurs every field cannot perform effective line doubling processing on an NTSC signal obtained by such 3-2 pull-down processing.

Conversion into a PAL signal is performed likewise in such a manner that 50 fields are generated each second from 24 frames of a film source. Since motion occurs every two fields, the line doubling device cannot perform effective line doubling processing either on a PAL signal obtained by converting a film source in this manner.

It is seen from the above description that the following problems occur if line doubling processing is performed on fields generated by such processing as the 3-2 pull-down or the 2-2 pull-down by using the above-described line doubling device that generates one line-doubled field from three fields.

The line doubling device handles fields as having different images though they have the same image actually. Therefore, with an NTSC signal obtained by the 3-2 pull-down processing, it is not recognized that a line-doubled image signal is one obtained from three fields of the same frame.

Further, the resolution decreases if intra-field processing is performed with an assumption that images of consecutive fields to be processed are different from each other.

Further, once the line frequency (line rate) is doubled, original film images cannot be restored any more.

To attain best image quality in restored original images, each frame of a file source should be processed as a still frame. However, the conventional line doubling device does not perform such processing. That is, although each frame (consisting of two or three fields) of a film source needs to be processed as a still frame, the line doubling device does not operate so as to realize the highest resolution when original images are restored.

The only method for solving the above problems is to redesign the line doubling device totally. However, this is costly and takes time.

SUMMARY OF THE INVENTION

The present invention has been made in view of the above circumstances, and an object of the invention is therefore to provide an image processing apparatus and method and a signal switching output device capable of performing line doubling processing by using a line doubling device without causing deterioration.

To solve the above problems, an image processing apparatus according to the invention comprises signal switching output means for receiving sequential input fields and for outputting, based on the sequential input fields, a plurality of fields obtained from the same image; and line doubling means for generating one line-doubled field using the plurality of fields that are output from the signal switching output means.

In the image processing apparatus having the above configuration, the signal switching output means receives sequential input fields and outputs, based on the sequential input fields, a plurality of fields obtained from the same image. The line doubling means generates one line-doubled field using the plurality of fields that are output from the signal switching output means.

In this manner, in the image processing apparatus, the line doubling means generates one line-doubled field using a plurality of fields obtained from the same image.

An image processing method according to the invention comprises a field output step of receiving sequential input fields and outputting, based on the sequential input fields, a plurality of fields obtained from the same image; and a line doubling step of generating one line-doubled field using the plurality of fields that are output by the fields output step.

In this manner, in the image processing method, the line doubling step generates one line-doubled field using a plurality of fields obtained from the same image.

A signal switching output device according to the invention receives sequential input fields and outputs, based on the sequential input fields, a plurality of fields obtained from the same image to line doubling means for generating one line-doubled field using the plurality of fields.

With this signal switching output device, the line doubling means generates one line-doubled field using a plurality of fields obtained from the same image.

DESCRIPTION OF THE PREFERRED EMBODIMENTS

Embodiments of the present invention will be hereinafter described in detail with reference the accompanying drawings.

The invention makes it possible to generate still frames even if line doubling processing is performed by the conventional line doubling device. Further, original film source images can be restored.

Figure 4:
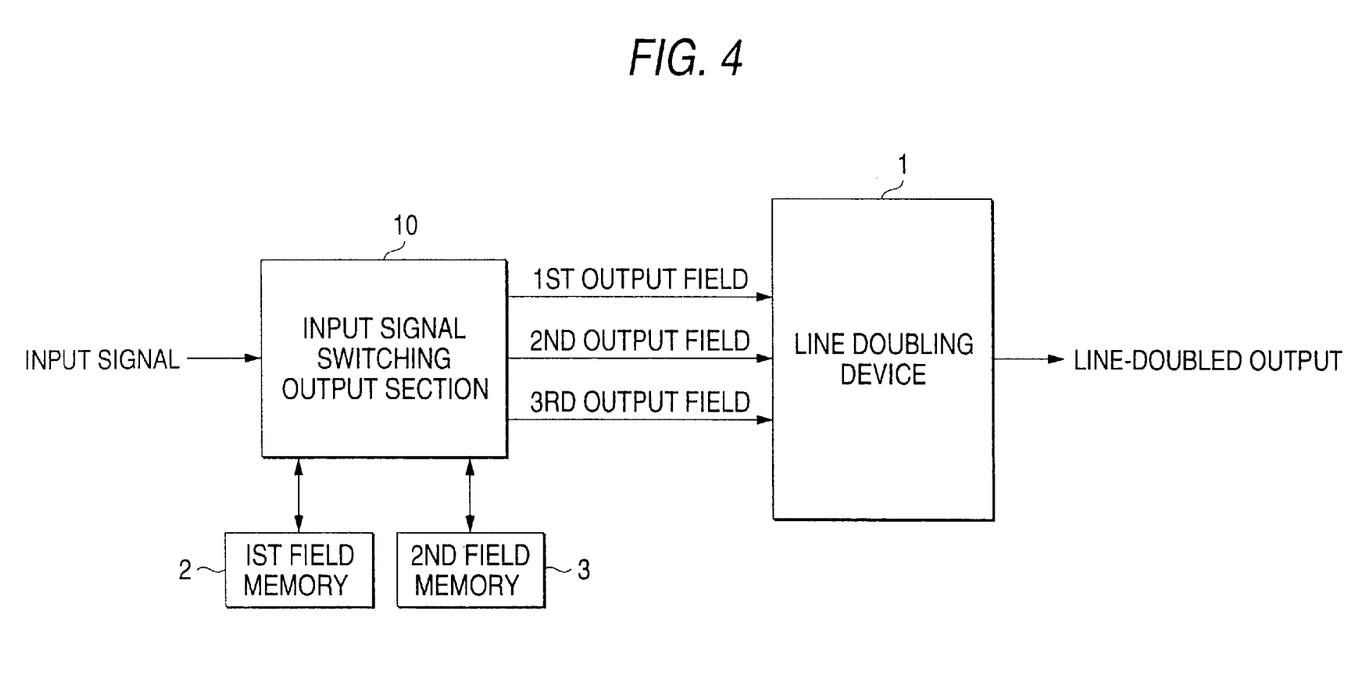
FIG. 4 is a block diagram showing the configuration of a line doubling processing system according to an embodiment of the present invention.

In the following embodiment, as shown in FIG. 4, the invention is applied to a line doubling processing section (line doubling processing system) that is provided with an input signal switching output section 10, two field memories 2 and 3, and a line doubling device 1.

The line doubling device 1 is a device for increasing the vertical resolution of a standard NTSC signal or PAL signal by doubling the number of vertical lines of each field. The line doubling device 1 generates an image of one line-doubled field based on input three fields. For a standard NTSC signal, for example, the number of vertical lines is increased from 525$i$ to 1050$i$ or 525$p$ by the line doubling device 1. That is, for a standard NTSC signal, the number of lines is increased from 262.5/field to 525/field. With this processing, the effect described above with reference to FIGS. 1A and 1B can be obtained.

The two (i.e., first and second) field memories 2 and 3 are image storing means for inputting three fields to the line doubling device 1. SDRAM spaces equivalent to the first and second field memories 2 and 3 may be provided in place of the latter. The first and second field memories 2 and 3 are necessary also conventionally to input three fields to the line doubling device. Therefore, the first and second field memories 2 and 3 and the line doubling device 1 are sections that are necessary to realize the conventional line doubling processing, and hence in substance the novel component of the line doubling processing system of FIG. 4 is the input signal switching output section 10.

Figure 5:
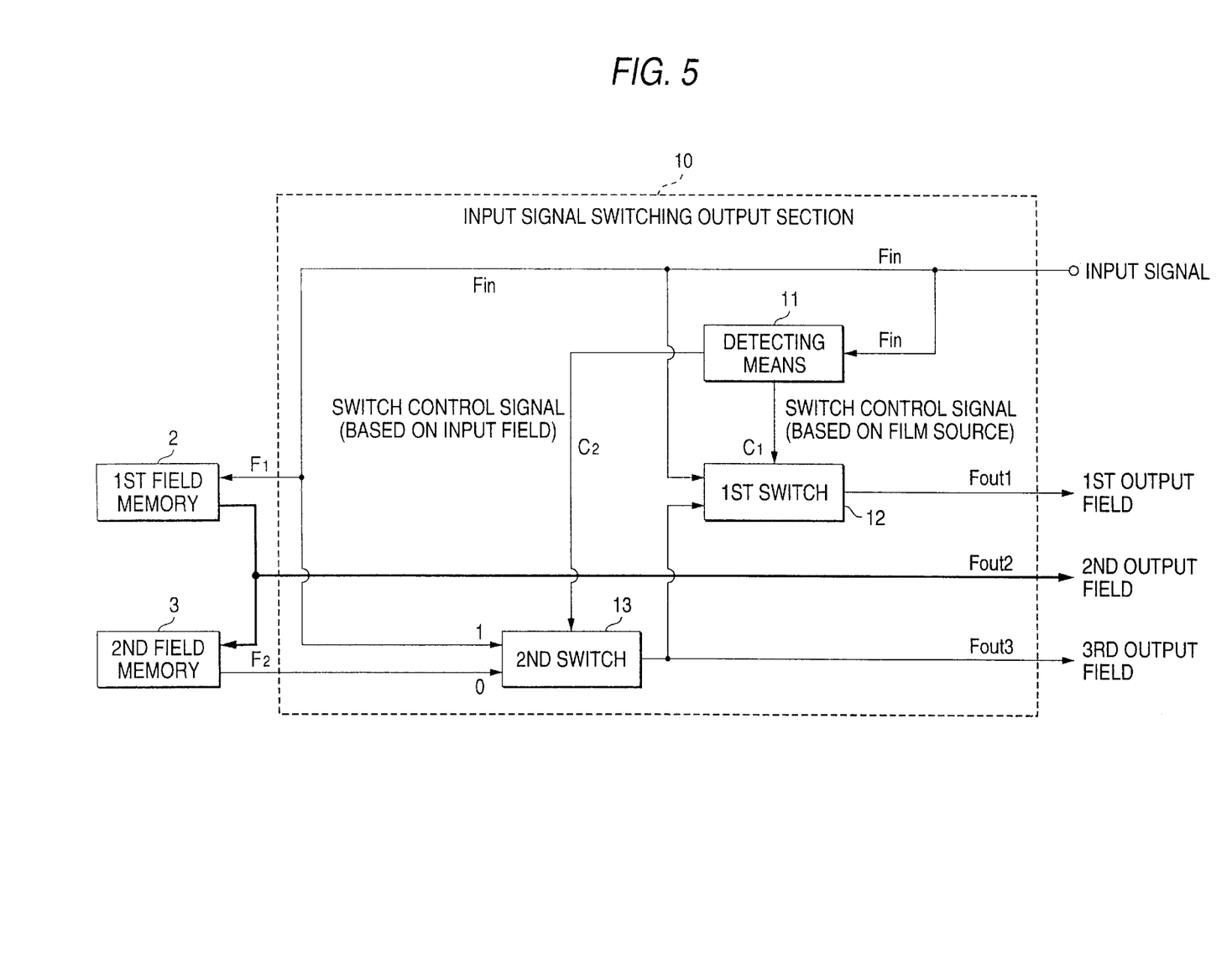
FIG. 5 is a block diagram showing a specific example of a line doubling device that is provided in the line doubling system of FIG. 4.

The input signal switching output section 10 functions as a signal switching output means that receives fields sequentially and outputs a plurality of fields obtained from the same image based on the input fields. Specifically, using the first and second frame memories 2 and 3, the input signal switching output section 10 outputs three fields constituting the same frame (same image) to the downstream line doubling device 1 based on an input signal that are input continuously. FIG. 5 shows a specific configuration of the input signal switching output section 10. In the following description, three fields that are output from the input signal switching output section 10 to the line doubling device 1 will be referred to as "first to third output fields."

As shown in FIG. 5, the input signal switching output section 10 is provided with a detecting means 11 and first and second switches 12 and 13. The first and second field memories 2 and 3 are connected to the input signal switching output section 10.

In this input signal switching output section 10, a field (hereinafter referred to as "input field") $F_{in}$ as an input signal that is input to the input signal switching output section 10 is input to the detecting means 11 as well as the first switch 12 and the second switch 13. The input field $F_{in}$ is also input to the first field memory 2. The input field (input signal) $F_{in}$ is a current field digital input signal.

The detecting means 11 to which the input signal is input is a section for performing switching controls on the first and second switches 2 and 3 based on the input signal. That is, the first switch 12 and the second switch 13 are controlled in accordance with detection results of the detecting means 11. For example, the detecting means 11 detects whether the input source as the input signal is a film source and whether it is in a current field phase of a 3-2 pull-down sequence, and controls the first and second switches 12 and 13 based on detection results. The controls on the first switch 12 and the second switch 13 that are performed based on the detection results of the detecting means 11 will be described in detail in describing the first switch 12 and the second switch 13.

On the other hand, the input field that is input to the first field memory 2 becomes a field that is output from the input signal switching output section 10 as a second output field $F_{out2}$. The first field memory 2 outputs, to the second field memory 3, a field $F_1$ that was received a one-field period before. The second field memory 3 outputs, to the second switch 13, a field F2 that was received a one-field period before. With such delayed output of fields, the field $F_1$ that is output from the first field memory 2 is delayed from the input field $F_{in}$ by a one-field period and the field $F_2$ that is output from the second field memory 3 is delayed from the input field $F_{in}$ by a two-field period.

The second switch 13 is used for selecting one of the current input field and the two-field-delayed field, and serves to output a first output field $F_{out1}$, and a third output field $F_{out3}$.

Specifically, switching-controlled based on a switch control signal $C_2$ that is supplied from the detecting means 11, the second switch 13 outputs, to the downstream stage, one of the input field $F_{in}$ and the field $F_2$ that is supplied from the second field memory 3.

As a function relating to the switching control on the second switch 13, the detecting means 11 detects a prescribed phase in a repetition cycle of input field images that are input sequentially. The second switch 13 is controlled based on phase information produced by the detecting means 11. For example, with such a control, the second switch 13 outputs the input field $F_{in}$ in response to a switch control signal $C_2$ (e.g., a signal "1") that is supplied from the detecting means 11 when the input field $F_{in}$ is an even-numbered field obtained by execution of 3-2 pull-down processing. The second switch 13 outputs the field $F_2$ that is supplied from the second field memory 3 in response to a switch control signal $C_2$ (e.g., a signal "0") that is supplied from the detecting means 11 when the input field $F_{in}$ is an odd-numbered field obtained by execution of 3-2 pull-down processing.

The "odd-numbered field obtained by execution of 3-2 pull-down processing" is the first or third one of three fields that are read out from one frame of a film source by 3-2 pull-down processing or the first one of two fields likewise read out; for example, it is one of the two fields A or the field B' shown in FIG. 3. The "even-numbered field obtained by execution of 3-2 pull-down processing" is the second field of three or two fields that are read out from one frame of a film source by 3-2 pull-down processing; for example, it is the field A' or B shown in FIG. 3.

The field $F_2$ that is output from the second switch 13 is then output from the input signal switching output section 10 as a third output field $F_{out3}$, and is also supplied to the first switch 12. If the input signal (input source) is not a film source, the second switch 13 outputs, as the third output field $F_{out3}$, the field $F_2$ that is supplied from the second field memory 3 irrespective of the input field $F_{in}$ based on the switch control signal $C_2$ that is supplied from the detecting means 11.

As described above, the first switch 12 also receives the input field $F_{in}$. If the input signal is not a film source, the first switch 12 is switched so as to output the input signal. If the input signal is a film source signal, the first switch 12 is switched so as to output the output signal of the second switch 13.

Specifically, the first switch 12, which is switching-controlled based on a switch control signal $C_1$ that is supplied from the detecting means 11, outputs, to the downstream stage, one of the field $F_2$ (i.e., the same field as the third output field $F_{out3}$) that is supplied from the second switch 13 and the input field $F_{in}$. Specifically, the first switch 12 outputs the field $F_2$ that is supplied from the second switch 13 in response to a switch control signal $C_1$ (e.g., a signal "1") that is supplied from the detecting means 11 when the input field F (input source) is a film source. The first switch 12 outputs the input field $F_{in}$ in response to a switch control signal (e.g., a signal "0") that is supplied from the detecting means 11 when the input source is not a film source. The field that is output from the first switch 12 is then output from the input, signal switching output section 10 as a first output field $F_{out}$.

The line doubling device 1 outputs a line-doubled one-field image based on the first to third output fields $F_{out1}$, $F_{out2}$, and $F_{out3}$ that are supplied from the input signal switching output section 10 that operates in accordance with the input field $F_{in}$ and the input source in the above-described manner.

The components of the line doubling processing system have been described above. Next, the operation of the line doubling processing system will be described according to a flow of an input signal (input field image or input source).

Before that, a description will be made of a conventional example in which ordinary operation is performed on an NTSC signal obtained by execution of 3-2 pull-down processing. In the conventional case, three fields that are input to the line doubling device have five different patterns shown in FIG. 6 (bottom part).

The above patterns of three fields are equivalent to patterns of a case where the detecting means 11 of the input signal switching output section 10 detects that the input source is an ordinary camera source and the first switch 12 outputs the input field $F_{in}$ as the first output field $F_{out1}$ and the second switch 13 outputs, as the third output field $F_{out3}$, the field $F_2$ that is supplied from the second field memory 3.

The five patterns are as follows. For example, in the first column of the bottom part of FIG. 6, one field (field A) of the current frame and two fields (fields Z' and Z) of the immediately preceding frame constitute three (one plus two) fields. In the next column, two fields (fields A' and A) of the current frame and one field (field Z') of the immediately preceding frame constitute three (two plus one) fields. In the third column, three fields (fields A, A', and A) of the current frame constitute three (three plus zero) fields. Subsequently, in similar manners, one plus two fields, two plus one fields, three plus zero fields, . . . constitute three fields.

If the ordinary operation is performed on an NTSC signal obtained by execution of 3-2 pull-down processing in the above-described manner, the first to third output fields $F_{out1}$, $F_{out2}$, and $F_{out3}$ may be fields that constituted different frames before the execution of the 3-2 pull-down processing. Therefore, as described above, the line doubling device cannot perform the line doubling processing effectively.

In contrast, by providing the input signal switching output section 10 immediately upstream of the line doubling device 1 according to the invention, the problems of the conventional device can be solved. Next, the operation of the line doubling processing system will be described according to a flow of an input signal. A description will be made of a case where the input signal is one obtained by execution of 3-2 pull-down processing.

Receiving an input signal, the detecting means 11 detects whether the input source (input signal) is a film source and whether it is in a current field phase of a 3-2 pull-down sequence.

If detecting that the input source is a film source, the detecting means 11 switches the first switch 12 using a switch control signal $C_1$ to cause the first switch 12 to output a field $F_2$ that is supplied from the second switch 13.

Further, based on the phase information of the input source, the detecting means 11 outputs a signal "0" or "1" to the second switch 13 as a switch control signal $C_2$. The switch control signal $C_2$ of "0" or "1" has timing shown in the top of FIG. 6. The detecting means 11 outputs "1" if the input field $F_{in}$ is the second field that is obtained by execution of 3-2 pull-down processing, and outputs "0" if the input field $F_{in}$ is another field. The term "second field" means the second one of three fields that are read out from one frame of a film source by 3-2 pull-down processing.

If the detecting means 11 outputs "1," the second switch 13 outputs the input field $F_{in}$, which is then output as the third output field $F_{out3}$ and also output as the first output field $F_{out1}$, via the first switch 12.

If the detecting means 11 outputs "0," the second switch 13 outputs the field $F_2$ that is supplied from the second field memory 3. The field $F_2$ is then output as the third output field $F_{out3}$ and also output as the first output field $F_{out1}$ via the first switch 12.

With the above operation, the first and third output fields $F_{out1}$ and $F_{out3}$ are always made the same field. The second output field $F_{out2}$ as a timing of the output signal is not switched. As such, both of the first and third output fields $F_{out1}$ and $F_{out3}$ are switched and serve as complementary fields to the second output field $F_{out2}$ in a reliable manner.

Figure 6:
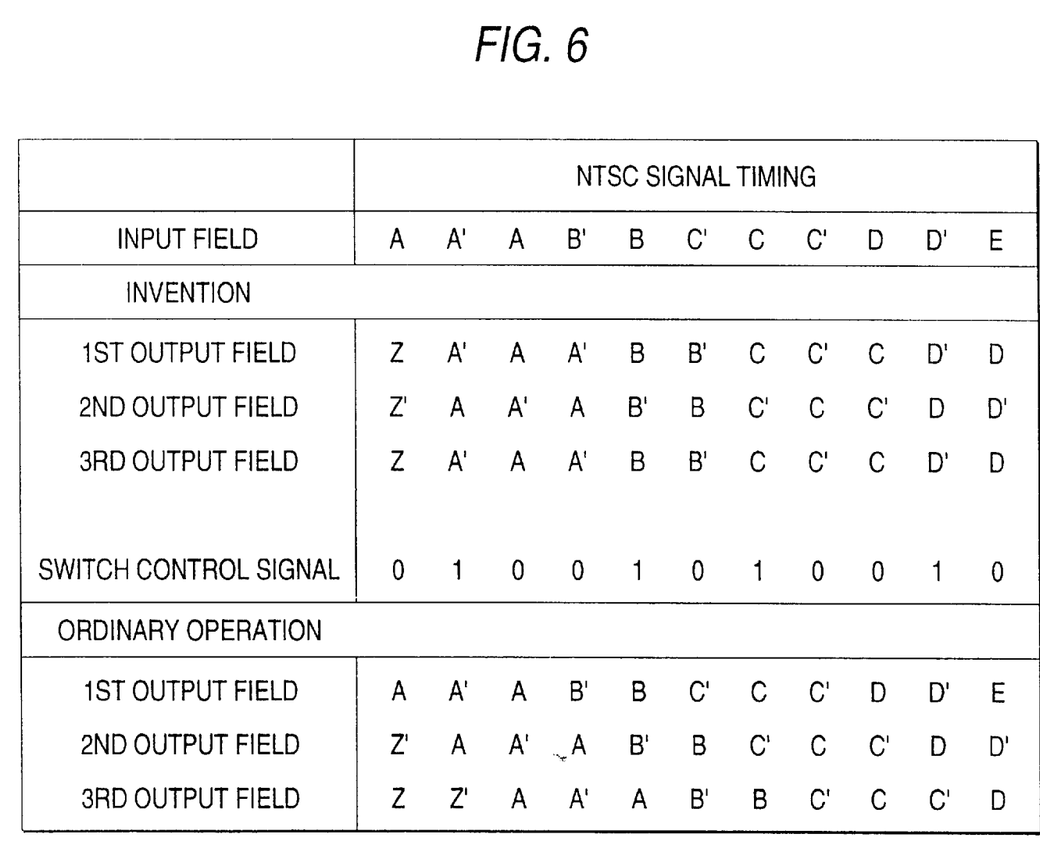
FIG. 6 is a table showing signal timing of first to third output fields for an NTSC signal.

With the above processing, as shown in the top part of FIG. 6, the first to third output fields $F_{out1}$, $F_{out2}$, and $F_{out3}$ become field images obtained from the same image (frame). The line doubling device 1 can process a signal continuously so as to produce still images.

Where the input signal is not one obtained by execution of 3-2 pull-down processing but an ordinary camera source or the like, the detecting means 11 switches the first switch 12 using the switch control signal $C_1$ to cause the first switch 12 to output the input field $F_{in}$. Further, the detecting means 11 outputs a signal "0" as the switch control signal $C_2$ to be supplied to the second switch 13.

As a result, the first switch 12 always outputs the input field $F_{in}$, which is then output as the first output field $F_{out1}$. The second switch 13 outputs a field $F_2$ (i.e., a field that is delayed from the input field $F_{in}$ by a two-field period) that is supplied from the second field memory 3. The field $F_2$ is then output as the third field $F_{out3}$. At this time, a field $F_1$ (i.e., a field that is delayed from the input field $F_{in}$ by a one-field period) that is output from the first field memory 2 is then output as the second output field $F_{out2}$.

The individual sections of the input signal switching output section 10 operate in accordance with an input signal in the above manner. As a result, the input signal switching output section 10 outputs first to third fields $F_{out1}$, $F_{out2}$, and $F_{out3}$ that are obtained from the same image (frame) to the downstream line doubling device 1 if it receives a film source that was obtained by execution of 3-2 pull-down processing. The input signal switching output section 10 outputs first to third output fields $F_{out1}$, $F_{out2}$, and $F_{out3}$ having a one-field delay in between to the downstream line doubling device 1 if it receives an ordinary camera source or the like.

With the above operation, the line doubling processing system can perform the line doubling processing on film source images that is optimized in consideration of the NTSC 3-2 pull-down field sequence and the PAL 2-2 pull-down field sequence.

Also, the line doubling processing system can greatly increase the vertical resolution of a moving body in images. This enables correction when a film source and the processing method of the line doubling device 1 for an ordinary camera source do not conform to each other.

The invention dispenses with redesigning of an existing line doubling device. The input signal switching output section 10 is implemented easily and hence its cost can be made low. It is not necessary to add new memories because the first and second field memories 2 and 3 are already used as part of conventional line doubling processing systems, and the logic can be made very small. Further, there are apparent effects of improvement in the interpretation of a film source and hence advantages of a film camera can be utilized to a greatest extent.

Figure 7:
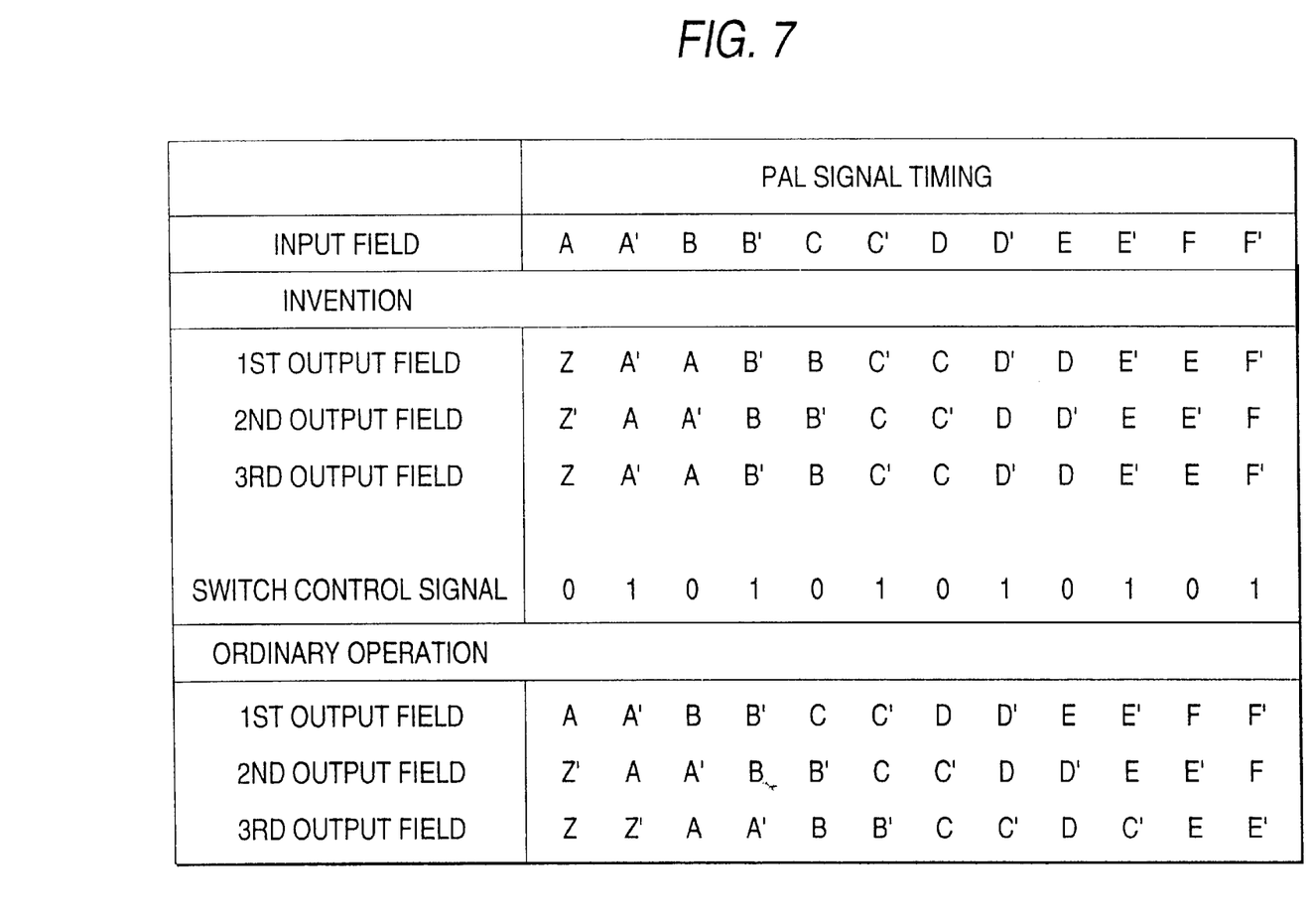
FIG. 7 is a table showing signal timing of first to third output fields for a PAL signal.

The invention can also be applied to images obtained by execution of 2-2 pull-down processing. In the case of the 2-2 pull-down processing, 50 fields are generated every second from 24 frames of a film source and a PAL signal having motion every two fields is generated.

Where ordinary operation is performed on a PAL signal obtained by execution of such 2-2 pull-down processing, three fields that are input to the line doubling device are ones obtained from different frames as shown in the bottom part of FIG. 7. In contrast, by virtue of the above-described operation of the input signal switching output section 10 according to the invention, three fields that are input to the line doubling device 1 are ones obtained from the same frame as shown in the top part of FIG. 7.

In the image processing apparatus according to the invention, the signal switching output means receives sequential input fields and outputs, based on the input fields, a plurality of fields obtained from the same image. The line doubling means generates one line-doubled field using the plurality of fields that are output from the signal switching output means. In this manner, the line doubling means can generate one line-doubled field using a plurality of fields obtained from the same image.

The image processing method according to the invention comprises the steps of a field output step of receiving sequential input fields and outputting, based on the input fields, a plurality of fields obtained from the same image; and a line doubling step of generating one line-doubled field using the plurality of fields that are output by the field output step. In this manner, the line doubling step can generate one line-doubled field using a plurality of fields obtained from the same image.

A signal switching output device according to the invention receives sequential input fields and outputs, based on the input fields, a plurality of fields obtained from the same image to line doubling means for generating one line-doubled field using the plurality of fields. In this manner, the line doubling means can generate one line-doubled field using a plurality of fields obtained from the same image.

What is claimed is:

1. An image processing apparatus comprising:
   signal switching output means for receiving sequential input fields and for outputting, based on the sequential input fields, a plurality of fields obtained from the same image; and
   line doubling means for generating one line-doubled field using the plurality of fields that are output from the signal switching output means;
   whereby a determination is made as to whether or not the source of said input fields is a film source, and the outputting of said plurality of fields is based, at least in part, on said determination.

2. The image processing apparatus according to claim 1, wherein the signal switching output means outputs three fields obtained from the same image, and wherein the line doubling means generates one line-doubled field using the three fields that are output from the signal switching output means.

3. The image processing apparatus according to claim 1, wherein the signal switching output means comprises detecting means for detecting a prescribed phase in a repetition cycle of the sequential input fields, and wherein the signal switching output means outputs the plurality of fields obtained from the same image in accordance with a phase detection result of the detecting means.

4. The image processing apparatus according to claim 1, wherein the sequential input fields that are input to the signal switching output means are fields that were subjected to 3-2 pull-down processing or 2-2 pull-down processing.

5. The image processing apparatus according to claim 1, further comprising image signal storing means for delaying an input field and for outputting a delayed field, wherein the signal switching output means comprises switch means for outputting, by switching between them, one of the delayed field that is output from the image signal storing means and the input field, and wherein the signal switching output means outputs the plurality of fields obtained from the same image by switching the switch means in accordance with the input field.

6. The image processing apparatus according to claim 1, wherein the signal switching output means outputs the plurality of fields obtained from the same image if the sequential input fields are fields that were subjected to 3-2 pull-down processing or 2-2 pull-down processing, and outputs, as the plurality of fields, the sequential input fields in the same order as input order thereof if the sequential input fields are fields that were not subjected to any pull-down processing.

7. An image processing method comprising the steps of:
a field output step of receiving sequential input fields and outputting, based on the sequential input field, a plurality of fields obtained from the same image; and
a line doubling step of generating one line-doubled field using the plurality of fields that are output by the field output step;
whereby a determination is made as to whether or not the source of said input fields is a film source, and the outputting of said plurality of fields is based, at least in part, on said determination.

8. The image processing method according to claim 7, wherein the field output step outputs three fields obtained from the same image, and wherein the line doubling step generates one line-doubled field using the three fields that are output by the field output step.

9. A signal switching output device which receives sequential input fields and outputs, based on the sequential input fields, a plurality of fields obtained from the same image to line doubling means for generating one line-doubled field using the plurality of fields;
whereby a determination is made as to whether or not the source of said input fields is a film source, and the outputting of said plurality of fields is based, at least in part, on said determination.

10. The signal switching output device according to claim 9, wherein the signal switching output device outputs three fields obtained from the same image, and wherein the line doubling means generates one line-doubled field using the three fields.

11. The signal switching output device according to claim 9, comprising detecting means for detecting a prescribed phase in a repetition cycle of the sequential input fields, wherein the signal switching output device outputs the plurality of fields obtained from the same image in accordance with a phase detection result of the detecting means.

12. The signal switching output device according to claim 9, wherein the sequential input fields are fields that were subjected to 3-2 pull-down processing or 2-2 pull-down processing.

13. The signal switching output device according to claim 9, comprising switch means for outputting, by switching between them, one of an input field and a delayed field that is output from an image signal storing means for delaying the input field and outputting the delayed field; and
outputting the plurality of fields obtained from the same image by switching the switch means in accordance with the input field.

14. The signal switching output device according to claim 9, wherein the signal switching output device outputs the plurality of fields obtained from the same image if the sequential input fields are fields that were subjected to 3-2 pull-down processing or 2-2 pull-down processing, and outputs, as the plurality of fields, the sequential input fields in the same order as input order thereof if the sequential input fields are fields that were not subjected to any pull-down processing.

* * * * *